(12) United States Patent
Pistemaa et al.

(10) Patent No.: US 7,561,203 B2
(45) Date of Patent: Jul. 14, 2009

(54) USER INPUT DEVICE

(75) Inventors: Jari Pistemaa, Pertteli (FI); Niko Porjo, Turku (FI)

(73) Assignee: Nokia Corporation, Espoo (FI)

( * ) Notice: Subject to any disclaimer, the term of this patent is extended or adjusted under 35 U.S.C. 154(b) by 637 days.

(21) Appl. No.: 11/033,453

(22) Filed: Jan. 10, 2005

(65) Prior Publication Data

US 2006/0155391 A1 Jul. 13, 2006

(51) Int. Cl.
*H04N 5/225* (2006.01)
(52) U.S. Cl. .................. 348/375; 348/240.99
(58) Field of Classification Search ................. 348/160, 348/207.99, 373, 376, 240.3, 240.99, 375; 396/76, 85, 86; 455/90.3, 556.1, 575.3; 307/106; 324/635; 356/139.03; 200/61.7; 379/93.17; 700/17
See application file for complete search history.

(56) References Cited

U.S. PATENT DOCUMENTS

| | | | | |
|---|---|---|---|---|
| 4,658,153 A | * | 4/1987 | Brosh et al. | 307/106 |
| 4,868,488 A | * | 9/1989 | Schmall | 324/635 |
| 5,838,432 A | * | 11/1998 | Tokuhashi et al. | 356/139.03 |
| 5,983,119 A | * | 11/1999 | Martin et al. | 455/575.7 |
| 6,035,137 A | * | 3/2000 | Kaneko et al. | 396/76 |
| 6,295,441 B1 | * | 9/2001 | Bjorkengren | 455/575.3 |
| 6,373,006 B1 | * | 4/2002 | Toki | 200/61.7 |
| 6,704,503 B2 | * | 3/2004 | Yoshikawa et al. | 396/76 |
| 2003/0090579 A1 | * | 5/2003 | Ohe et al. | 348/240.3 |
| 2004/0141064 A1 | * | 7/2004 | Ezawa | 348/207.99 |
| 2004/0218738 A1 | * | 11/2004 | Arai et al. | 379/93.17 |
| 2004/0259590 A1 | * | 12/2004 | Middleton | 455/556.1 |
| 2005/0208903 A1 | * | 9/2005 | Sakamoto | 455/90.3 |
| 2006/0105806 A1 | * | 5/2006 | Vance et al. | 455/556.1 |

OTHER PUBLICATIONS

Li et al., "A Novel Smart Resistive-Capacitive Position Sensor," IEEE Transactions on Instrumentation and Measurement, vol. 44, No. 3, Jun. 1995.*

* cited by examiner

*Primary Examiner*—Lin Ye
*Assistant Examiner*—Dennis Hogue
(74) *Attorney, Agent, or Firm*—Ware, Fressola, Van Der Sluys & Adolphson LLP

(57) ABSTRACT

A user input device for portable electronic devices having a first body element and a main body element arranged for pivotal movement or slidable movement with respect tot one another controls an intended functionality of the portable electronic device in a response to the relative position between the body elements.

16 Claims, 6 Drawing Sheets

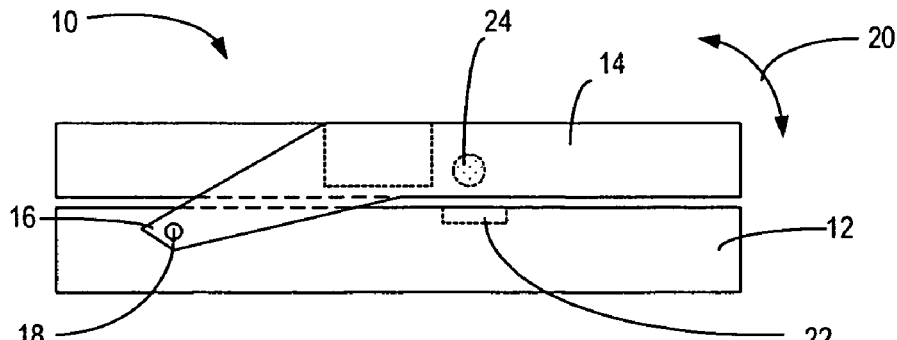
FIG. 1 PRIOR ART
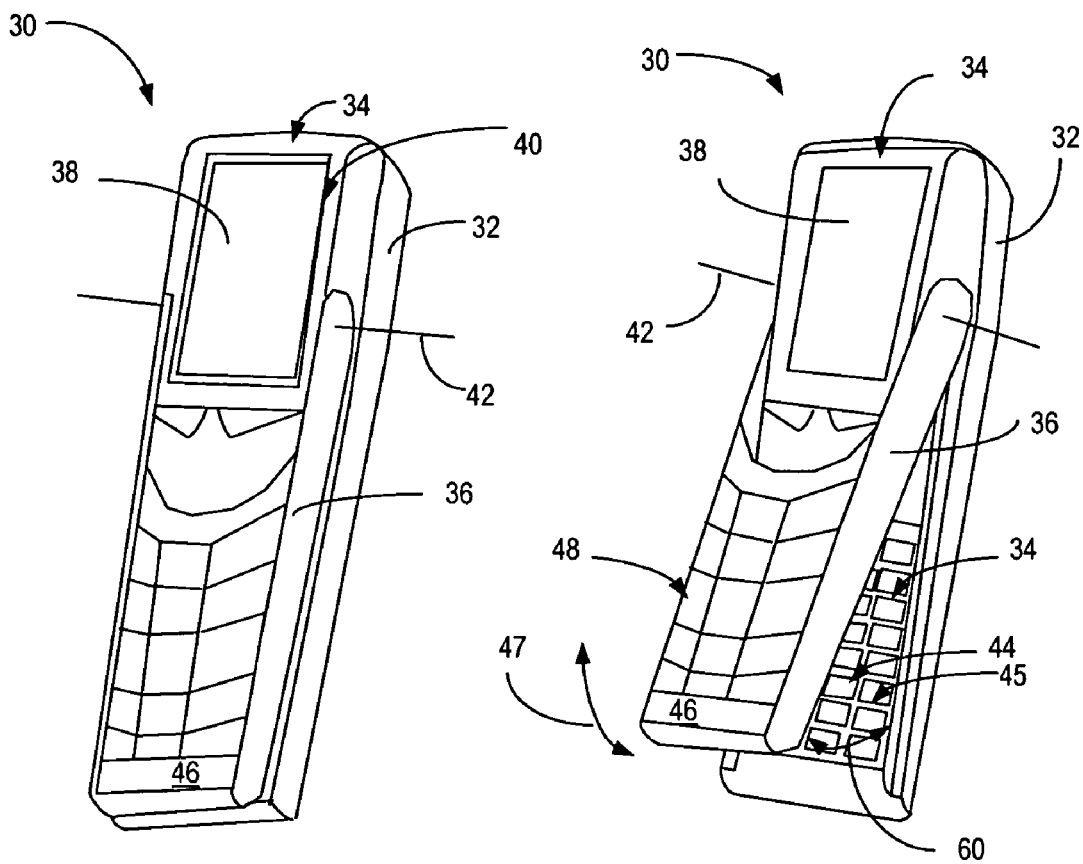
FIG. 2
FIG. 3

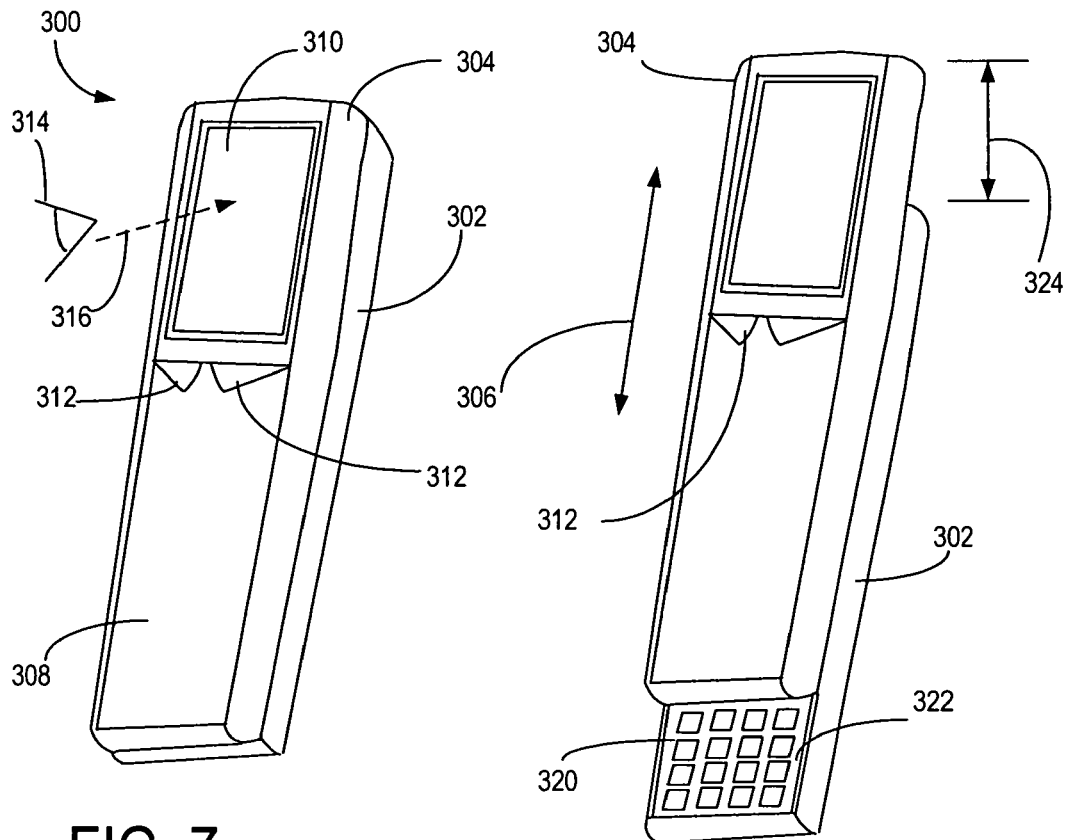
FIG. 7
FIG. 8
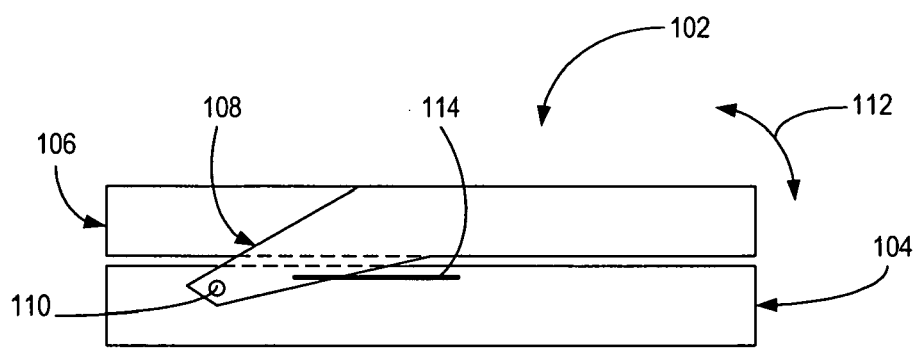
FIG. 12

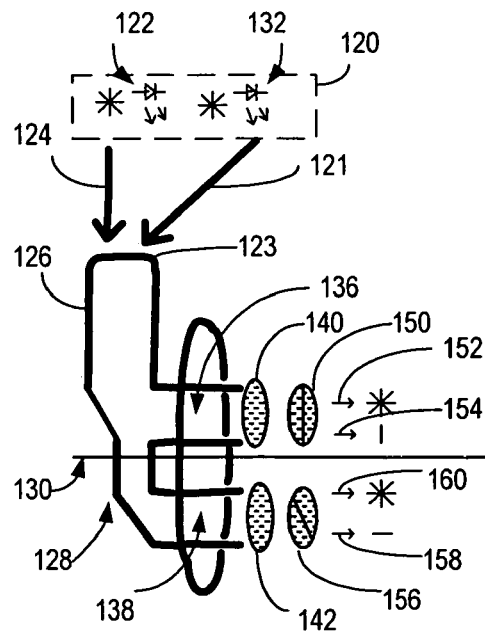
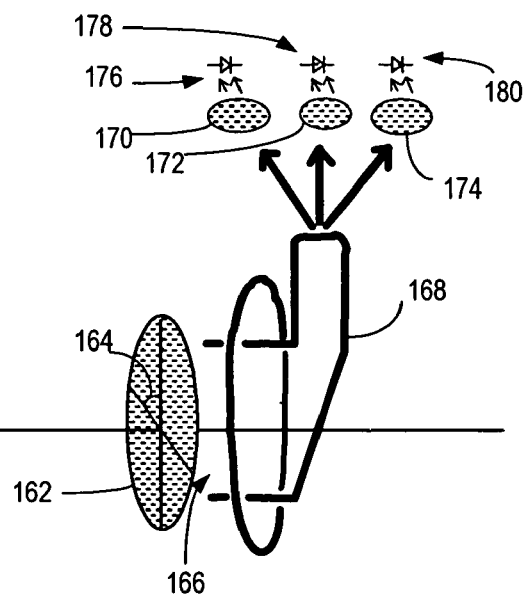
FIG.13A
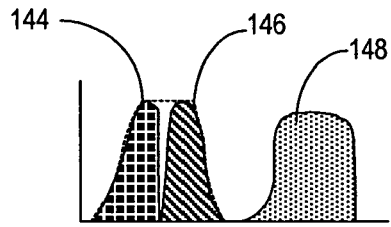
FIG.13B  FIG.13C  FIG.13D
FIG.13E
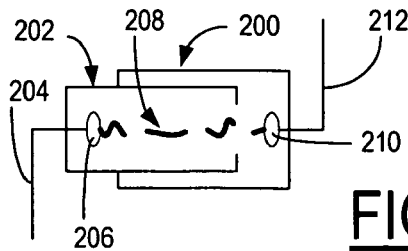
FIG. 14
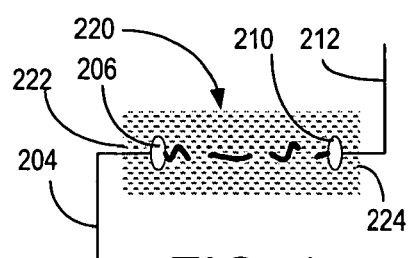
FIG. 15

USER INPUT DEVICE

TECHNICAL FIELD

The present invention relates generally to portable electronic devices and deals more particularly with a user input device for portable electronic devices having a first body element and a main body element arranged for movement with respect to one another to control an intended functionality of the portable electronic device in response to the relative position between the body elements.

BACKGROUND OF THE INVENTION

Portable electronic devices, such as for example, mobile telephones, include features and functionalities that are operated and controlled by the user through a user interface of some type. Such features and functionalities may include for example, game playing, volume control, image capture, and navigation through menus, address books, name lists and other PDA (personal digital assistant) type functions. It is known in the prior art to provide a user input device in the form of an analog joystick or in the form of operation of a combination sequence of two or more keys accessible to the user to carry out the intended function. One major limitation with a user input joystick it is cumbersome and not convenient to hold the portable electronic device while operating the joystick. Although a joystick offers smooth operation, the joystick also adds to the complexity and expense of the device packaging. A problem with key operated user input devices is only a few different selections can be made by the user and then only in discrete steps to provide "on-off" functionality or relatively course adjustment selection. One very popular and sought after feature and functionality by users of mobile telephones is image capture wherein a camera module is integral with the mobile telephone body element. A user typically points the camera module aperture in the desired direction and views the image to be captured on the display screen of the mobile telephone. A designated key or button on the mobile telephone is pressed by the user to operate the camera shutter release to capture the image. Some mobile telephone camera modules include a telephoto functionality to make a distant image appear closer and larger through use of digital zoom or optical zoom techniques, which are well known and understood by those skilled in the imaging capture art. The zoom factor of the telephoto functionality of the camera module is chosen by the user through use of a user input device of some type, such as for example a joystick or key combination operation, to select a desired zoom factor from a number of possible zoom factors. Known prior art user input devices are generally limited for use to select a zoom factor in devices which have only a few different zoom factors available, however, when there are many possible zoom factors available it is difficult to select a desired zoom factor from the many different zoom factors available using a joystick or key combination operation user input device.

A further disadvantage of prior art user input devices, particularly key user input devices, for selecting a desired zoom factor is that many more key combinations are necessary to step through the possible different zoom factors available to select a desired zoom factor. Accordingly, zoom factor selection with prior art user input devices is time sensitive and not smooth when stepping for example from a low zoom factor to a high zoom factor.

It would also be desirable therefore to provide in a portable electronic device camera module a user input device for zoom factor selection that is smooth and continuous over a range of zoom factors to give the "feel" of a single lens reflex (SLR) camera to the user.

Foldable mobile telephones commonly referred to as "flip" or "clamshell" mobile telephones have enclosures wherein a cover pivots or rotates through an angular range with respect to a main body element from a closed operative position to an open operative position. Slidable mobile telephones have enclosures wherein a cover slides or moves along a rectilinear path through a linear range of movement with respect to a main body element from a closed operative position to an open operative position. It would be desirable to take advantage of the continuous motion between the cover and the main body element through at least a portion of the angular range and the linear range respectively such that the cover functions as a user input device.

It is therefore an object of the present invention to provide a user input device in a portable electronic device having a cover and a main body element arranged for movement with respect to one another wherein a signal proportional to and indicative of the relative position between the cover and the main body element is produced to operate an intended function of the portable electronic device.

SUMMARY OF THE INVENTION

A portable electronic device has a first body element and a main body element in which a user input device comprises the first body element arranged for movement with respect to the main body element for producing a signal proportional to the relative position between the first body element and the main body element for controlling the operation of an intended function of the portable electronic device. The first body element may be arranged for pivotal movement with respect to the main body element wherein the relative position signal is proportional to an angle formed between the first body element and the main body element over an angular range of pivotal movement. The first body element may be arranged foe slidable or rectilinear movement with respect to the main body element wherein the relative position signal is proportional to the relative position of the first body element with respect to the main body element over a linear range of rectilinear movement.

The portable electronic device may include a camera module for capturing images wherein the camera module includes a camera zoom functionality wherein the zoom factor is selectable by the user through the angular range. The main body element has a first surface relative to usage and a screen located in at least a portion of the first surface for displaying alphanumeric characters and graphics and images. The first body element has a first outwardly facing surface relative to usage and a second surface opposite the first outwardly facing surface wherein the second surface is in facing relationship with the main body element first surface in a first operative position whereby the main body element first surface is not accessible for use by a user, and wherein in a second operative position the first body element is pivoted to a fully open position away from the main body element first surface whereby the main body element first surface is accessible for use by a user. The camera zoom factor may be set to increase when the first body element pivots with an increasing angle formed between the first body element and the main body element or the camera zoom factor may be set to decrease when the first body element pivots with a decreasing angle formed between the first body element and the main body element. Further, the camera zoom factor may be set to increase when the first body element pivots with a decreasing angle formed between the first body element and the main body element or the camera zoom factor may be set to decrease when the first body element pivots with an increasing angle formed between the first body element and the main body element.

The portable electronic device may include a camera module for capturing images wherein the camera module includes a camera zoom functionality wherein the zoom factor is selectable by the user through the linear range. The main body element has a first surface relative to usage. The first body element has a first surface relative to usage and a screen located in at least a portion of the first surface and in a first operative position is in an overlying stacked relation with the main body element and the main body element first surface is not accessible for use by a user. In a second operative position, the first body element is slid or moved along a rectilinear path to a fully open position whereby the main body element first surface is accessible for use by a user. The camera zoom factor may be set to increase when the first body element moves relative to the main body element from the operative closed position to the operative open position or the camera zoom factor may be set to decrease when the first body element is moved relative to the main body element from the operative closed position to the operative open position over the linear range.

In a further aspect of the invention, at least another portion of the main body element first surface includes an arrangement of keys in a given configuration to carry out an intended function.

In a further aspect of the invention, the first body element is configured whereby the screen is viewable by a user when the portable electronic device is in its first operative position and in its second operative position and at least partially viewable by a user through a pre-defined angular range when the first body element is pivoted from the first operative position through the pre-defined angular range.

The camera module further includes a shutter release wherein the shutter release is responsive to the touching contact by a user on a key located on the main body element or on a key located on the first body element.

In a yet further aspect of the invention, the relative position between the first body element and the main body element is indicated by a sensor responsive to the relative position of the first body element with respect to the main body element. The sensor may further comprise a potentiometer connected between the first body element and the main body element whereby the resistance of the potentiometer is indicative of the relative position of the first body element with respect to the main body element. The sensor may further comprise an inductor in a resonant circuit mounted on the main body element whereby a change in the position of the first body element with respect to the main body element changes the inductance of the inductor and the resonant frequency of the resonant circuit wherein the changed resonant frequency is indicative of the position of the first body element with respect to the main body element. The sensor may further comprise a capacitor in a resonant circuit mounted on the main body element whereby a change in the position of the first body element with respect to the main body element changes the capacitance of the capacitor and the resonant frequency of the resonant circuit wherein the changed resonant frequency is indicative of the position of the first body element with respect to the main body element. The sensor may further comprise a light polarization system coupled between the main body element and the first body element. In one aspect, the light polarization system has a least one beam of light originating at one of the main body element and the second body element and a receiver located at the other of the main body element and the second body element whereby the magnitude of the light intensity of the beam of light received at the receiver is indicative of the position of the first body element with respect to the main body element. In a second aspect of the invention, a user input device is presented and comprises an electronic device having a main body element with a first surface relative to usage, a second body element connected to the main body element and arranged for movement with respect to the main body element and a sensor responsive to the relative position between the main body element and the second body element for producing an output signal having a magnitude proportional to the relative position between the first body element and the main body element for controlling the operation of an intended function of the electronic device.

BRIEF DESCRIPTION OF THE DRAWINGS

Additional objects, features and advantages of the present invention will become readily apparent from the written description of preferred embodiments taken in conjunction with the drawings wherein:

FIG. 1 is a schematic representation of a portable electronic device showing a prior art HALL-effect sensor in the main body element for detecting the magnetic field of a permanent magnet carried in the cover wherein the sensed magnetic intensity is indicative of the cover in the closed or open operative position.

FIG. 2 is a schematic perspective view of a foldable mobile telephone embodying the present invention showing the mobile telephone in its closed operative position.

FIG. 3 is a schematic perspective view of the mobile telephone illustrated in FIG. 2 showing the cover in a first illustrative angular position with respect to the main body element.

FIG. 7 is a somewhat schematic perspective view of a slidable mobile telephone embodying the present invention showing the mobile telephone in its closed operative position.

FIG. 8 is a schematic perspective view of the slidable mobile telephone illustrated in FIG. 7 showing the cover slid open from the closed operative position to its open operative position whereby the keys carried on the main body element are accessible for use by a user

FIG. 12 is a schematic representation of a portable electronic device embodying the present invention showing an indicator conductor having a predefined length and width mounted on the main body element in vicinity of the hinge wherein the capacitance between the cover and indicator wire varies in accordance with the spread angle between the cover and the main body element.

FIG. 13A is a schematic representation of a light polarization arrangement for use in detecting the spread angle between the cover and the main body element and for carrying data signals between the cover and the main body element.

FIG. 13B shows an intensity/wavelength graphic representation of a visual spectrum light signal utilized in the arrangement shown in FIG. 13A.

FIG. 13C shows an intensity/wavelength graphic representation of an infrared (IR) light signal utilized in the arrangement shown in FIG. 13A.

FIG. 13D shows an intensity/wavelength graphic representation of the filtered pass band signals received from the multi-mode fiber utilized in the arrangement shown in FIG. 13A.

FIG. 13E shows an intensity/wavelength graphic representation of the filtered visual and IR light signals as a result of the polarization angle change due to the relative rotation of the cover with respect to the main body element utilizing the arrangement shown in FIG. 13A.

FIG. 14 is a schematic representation of a concentric drum mechanical arrangement for use in the light polarization arrangement shown in FIG. 13A-13E.

FIG. 15 is a schematic representation of an alternate mechanical arrangement for use in the light polarization arrangement shown in FIG. 13A-13E.

WRITTEN DESCRIPTION OF PREFERRED EMBODIMENTS

Figure 4:
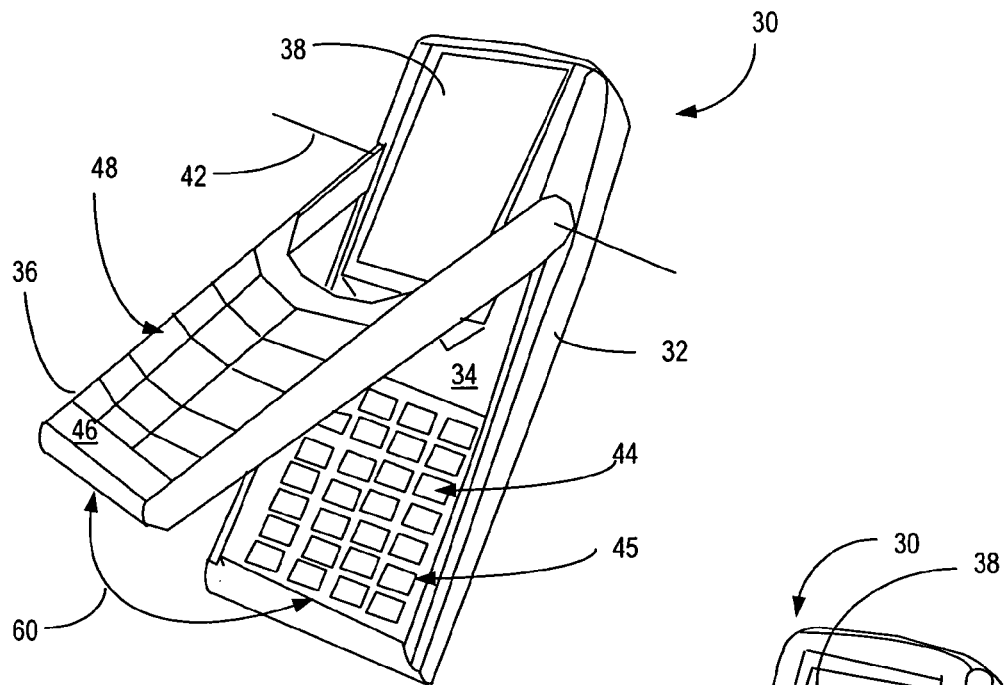
FIG. 4 is a schematic perspective view of the mobile telephone illustrated in FIG. 2 showing the cover in a second illustrative angular position with respect to the main body element.
Figure 6:
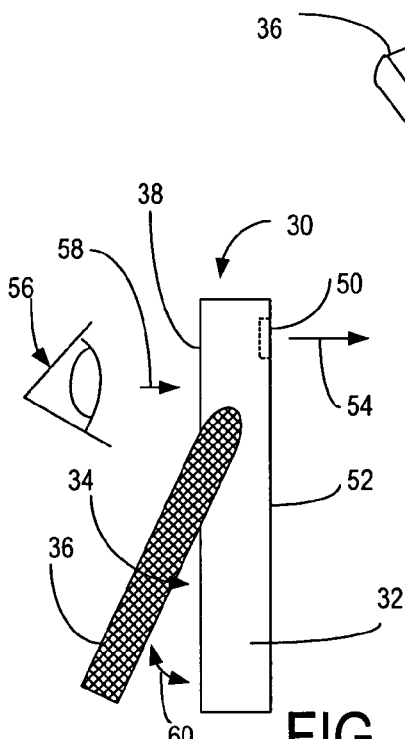
FIG. 6 is a schematic side view of the mobile telephone embodying the present invention showing the camera module and the spread angle between the cover and the main body element.

Turning now to the drawings and considering the invention in further detail, a schematic representation of a portable electronic device generally designated 10 embodying the prior art is illustrated therein and includes a main body element 12 and a first body element or cover 14 connected to the main body element 12 via the hinge 16 for pivotal movement with respect to the main body element 12 about the pivot axis 18 when the cover 14 is rotated between a closed operative position and an open operative position as represented by the direction of motion arrow 20. The cover position of the portable electronic device 10 is detected and indicated by means of a Hall-effect sensor generally designated 22 carried in the main body element 12 in cooperation with a permanent magnet 24 carried in the cover 14 in the vicinity of the HALL-effect sensor 22. The arrangement of the HALL-effect sensor 22 and permanent magnet 24 is limited to providing a two state indication of the cover position in either the closed operative state wherein the cover 14 is in a close proximity to or overlying stacked relation with respect to the main body element 12 or an open state wherein the cover 14 is pivoted away from the main body element 12. The combination of the HALL-effect sensor 22 and permanent magnet 24 typically cannot for all practical purposes provide an indication of the cover position with respect to the main body element or spread angle other than the cover being in a closed position or an open position. The prior art Hall-effect sensor arrangement may also be utilized with other portable electronic devices, for example, a foldable mobile telephone, a slidable mobile telephone, PDA devices and other similar devices to provide an indication of the cover being in a closed position or an open position.

Turning now to FIGS. 2-6, a portable electronic device, such as for example, a mobile telephone embodying the present invention is illustrated therein and generally designated 30. The mobile telephone 30 includes a main body element 32 having a first major surface relative to usage generally designated 34. A first body element or cover generally designated 36 is in an overlying stacked relationship with a portion of the main body element 32 in a closed operative position as illustrated in FIG. 2. The mobile telephone 30 includes a screen 38 constructed in a portion 40 of the main body element first major surface 34 for displaying alphanumeric text, graphics, images or other such graphic representations as well known and familiar to mobile telephone users. The cover 36 is arranged for pivotal movement with respect to the main body element 32 about the pivot axis 42 when the cover 36 is moved toward and away from the main body element 32 as represented by the direction arrow 47. The first major surface 34 of the main body element 32 may carry a keyboard or an arrangement of keys generally designated 44 in another portion 45 of the first major surface away from the screen. The keys 44 are hidden by the cover 36 when the mobile telephone 30 is in its closed operative position and are exposed and accessible to a user when the cover 36 is rotated away from the main body element. The cover 36 also includes a first major surface generally designated 46 relative to usage and may carry an arrangement of keys 48 configured to carryout an intended function of the mobile telephone 30. As illustrated in the schematic side view in FIG. 6, the mobile telephone 30 may have image capturing functionality and may include a camera module generally designated 50 located on the back or rear surface 52 disposed opposite the first major surface 34 of the main body element 32. In accordance with the present invention, a user aims the aperture of the camera module 50 in the direction indicated by the arrow 54 toward the desired image to be captured. The viewer 56 observes on the screen 38 in the direction indicated by arrow 58 the image to be captured. The camera module may include a shutter release wherein the shutter release operates in response to the operation of a key or button by the user. The key or button can be located on the main body element or the first body element. The shutter release may also be arranged to operate in response to keys placed in several different locations on the main body element, the first body element and the keyboard. The keys may also be identifiable by shape or color to make it easier for a user to locate and operate the shutter release. As explained in further detail below, a user holds the main body element 32 with one hand while rotating the cover 36 toward and away from the main body element 32 to select a desired zoom factor to make the image to be captured appear closer and larger as desired wherein the zoom factor is determined by the spread angle generally designated 60 formed between the main body element 32 and the cover 36.

Figure 5:
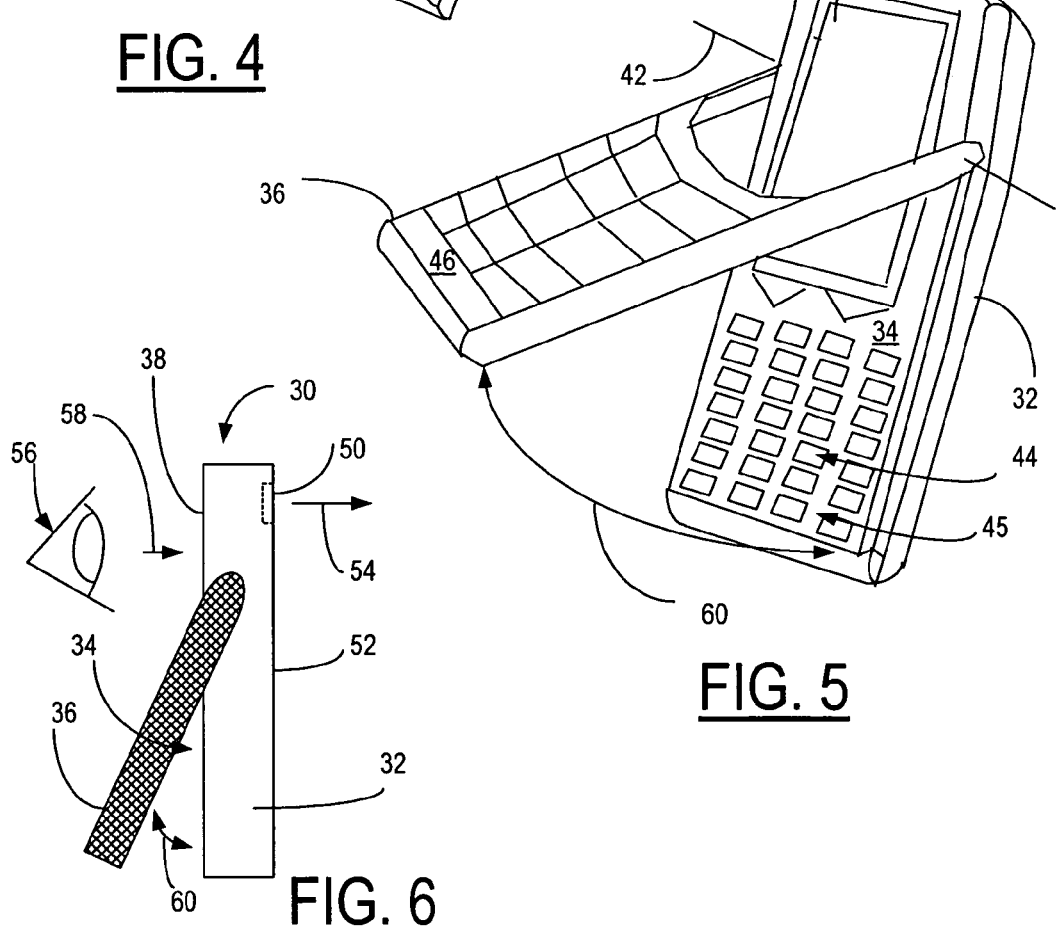
FIG. 5 is a schematic perspective view of the mobile telephone illustrated in FIG. 2 showing the cover in a third illustrative angular position with respect to the main body element.

In accordance with one exemplary embodiment of the present invention, when the camera functionality of the mobile telephone 30 is activated and the position of the cover 36 is changed or rotated toward and away from the main body element 32, the camera zoom factor increases or decreases in accordance with the spread angle 60 between the cover 36 and the main body element 32. As illustrated in FIG. 5, the spread angle 60 can be quite large before a display shown on the screen 38 becomes obstructed and thus the angular range of the cover 36 with respect to the main body element 32 can be quite large. The direction of rotation of the cover 36 with respect to the main body element 32 to increase the zoom factor can be arranged to increase the zoom factor as the spread angle is increased or decrease the zoom factor as the spread angle is increased. Preferably a smaller spread angle 60 selects a lower zoom factor since it is more natural for a user to start from a low zoom factor. It is typically found to be more convenient for the user to hold the body element 32 in one hand while rotating the cover 36 with the other hand to "zoom in" to the desired size image. A typical spread angle range is from about ten degrees to 50 degrees although the present invention will operate with other angular ranges, which angular ranges are dependent upon the specific and particular mechanical design of the portable electronic device relative to viewing an image on the screen as the spread angle is made larger or smaller.

Turning now to FIGS. 7 and 8, a slidable mobile telephone embodying the present invention is illustrated schematically therein and generally designated 300. The slidable mobile telephone includes a main body element generally designated 302 and a first body element or cover generally designated 304 in an overlying stacked relationship with the main body element 302 and arranged for rectilinear movement with respect to the main body element in a direction as indicated by direction arrow 306. The cover 304 includes a first major surface 308 relative to usage and carries a screen generally designated 310 carried in a portion of the first major surface 308. One or more keys 312, 312 for carrying out associated functions of the mobile telephone are carried on the first major surface 308 and may be "soft keys" which operate in conjunction with icons, text and graphics shown on the screen 310. The cover 304 is arranged for slidable movement from a closed operative position as illustrated in FIG. 7 to a fully open operative position as illustrated in FIG. 8. As illustrated in FIG. 8, the first major surface 320 of the main body element 302 may carry a keyboard or an arrangement of keys generally designated 322 configured to carry out an intended function of the mobile telephone 300. The keys 322 are revealed and accessible by a user when the cover is extended from its closed operative position. The keyboard 322 is hidden by the cover 304 when the mobile telephone 300 is in its closed operative position.

The slidable mobile telephone may have image capturing functionality and may include a camera module located in any desirable location on the first body element or the main body element. A user would aim the aperture of the camera module in a direction toward the desired image to be captured. The viewer 314 observes on the screen 310 in the direction indicated by arrow 316 the image to be captured. The camera module may include a shutter release wherein the shutter release operates in response to the operation of a key or button by the user. The key or button can be located on the main body element or the first body element. The shutter release may also be arranged to operate in response to keys placed in several different locations on the main body element, the first body element and the keyboard 322. The keys may also be identifiable by shape or color to make it easier for a user to locate and operate the shutter release. A user would hold the main body element 302 while sliding the cover 304 toward or away from the main body element, that is, the cover is moved in a direction extending or retracting it from the main body element to select a desired zoom factor to make the image to be captured appear closer and larger as desired wherein the zoom factor is determined by the linear position of the cover with respect to the main body element over a linear range or distance generally designated 324.

Figure 9A:
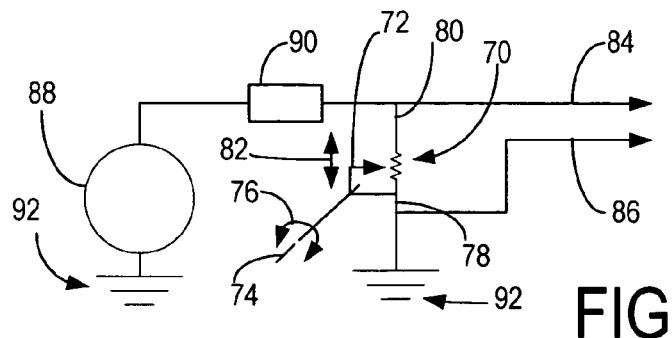
FIG. 9A shows an exemplary electrical circuit schematic diagram wherein a change in resistance of a potentiometer caused by movement of the cover is indicative of the relative position between the cover and the main body element.

A sensor responsive to the relative position of the first body element with respect to the main body element is used to indicate the spread angle or the linear position of the first body element with respect to the main body element. FIG. 9A is a schematic diagram of an exemplary electrical circuit, which circuit may be used in the present invention to indicate the relative position between the cover and the main body element, that is, the spread angle or the linear position. In FIG. 9A, a sensor comprising a potentiometer generally designated 70 has the center tap 72 suitably coupled or connected to the hinge point generally designated 74 between the cover and the main body element such that rotation of the cover relative to the main body element as indicated by the rotation arrow 76 causes the center tap 72 to slide back and forth over the resistance range as measured between the ends 78 and 80 respectively of the potentiometer 70 and thus the resistance as measured at end 80 varies with respect to the ground reference potential 92 as the center tap 72 moves as indicated by the direction arrow 82. The resultant output signal as measured across the terminals 84, 86 respectively may be input to a position sensing circuit wherein the changed resistance across the potentiometer 70 is indicative of the relative position between the cover and the main body element. As illustrated in FIG. 9A, a voltage source generally designated 88 is electrically connected to the end 80 of the potentiometer 70 through the series resistance 90 to provide a voltage divider network such that a change in the resistance of the potentiometer 70 causes the voltage potential at the junction of the series resistance 90 and potentiometer 70 to also change proportionally as the resistance of the potentiometer is varied due to the relative movement between the cover and the main body element. The voltage potential at the junction of the series resistance 90 and the potentiometer 70 is connected to the output 84. A suitable sensing circuit well known to those skilled in the art is connected across the output terminals 84 and 86 respectively to generate an appropriate relative position indicating signal. Alternately, the voltage potential source 88 may be an alternating frequency voltage signal and the output terminals 84, 86 respectively may be coupled to an analog-to-digital converter circuit to provide a digital output signal for use in indicating the spread angle between the cover and the main body element.

Figure 9B:
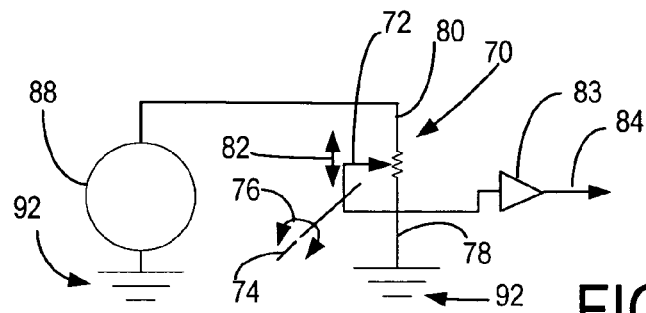
FIG. 9B shows another exemplary electrical circuit schematic diagram wherein a change in resistance of a potentiometer caused by movement of the cover is indicative of the relative position between the cover and the main body element.

FIG. 9B illustrates a schematic diagram of an electrical circuit similar to that shown in FIG. 9A and similar reference numbers refer to similar parts. In FIG. 9B, a sensor comprising a potentiometer 70 has the center tap 72 suitably coupled or connected to the hinge point 74 between the cover and the main body element such that rotation of the cover relative to the main body element as indicated by the rotation arrow 76 causes the center tap 72 to slide back and forth over the resistance range as measured between the ends 78 and 80 respectively of the potentiometer 70 and thus the resistance as measured at the center tap 72 varies with respect to the ground reference potential 92 as the center tap 72 moves as indicated by the direction arrow 82. The voltage signal at the center tap 72 is fed to a suitable amplifier or buffer amplifier 83 and the resultant output signal is fed to the terminal 84 which may be the input to a position sensing circuit wherein the changed resistance of the potentiometer 70 is indicative of the relative position between the cover and the main body element. In FIG. 9B, the voltage source 88 is electrically connected to the end 80 of the potentiometer 70 and the voltage potential at the center tap 72 changes proportionally as the resistance of the potentiometer is varied due to the relative movement between the cover and the main body element.

Figure 10:
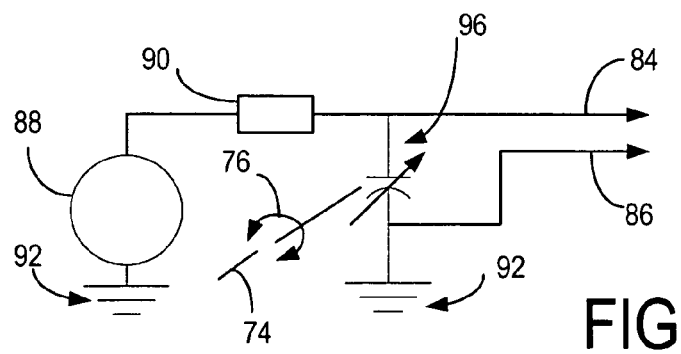
FIG. 10 shows an exemplary electrical circuit schematic diagram wherein a change in the capacitance of a trimmer capacitor caused by movement of the cover is indicative of the relative position between the cover and the main body element.

A further example of an electrical circuit that may be implemented to indicate the spread angle between the cover and main body element is illustrated in FIG. 10 wherein a variable capacitor or trimmer capacitor generally designated 96 is connected to the hinge point 74 such that rotation of the cover with respect to the main body element in the direction as indicated by arrow 76 causes the capacitance of the trimmer capacitor 96 to change as the spread angle between the cover and the main body element changes wherein the change in capacitance is measured across the terminals 84, 86 by means of a suitable sensing circuit coupled across the output terminals 84 and 86 respectively. The trimmer capacitor 96 may be part of a resonant circuit wherein a change in the capacitance of the trimmer capacitor 96 causes a change in the resonant frequency of the tuned circuit and which change in frequency may also be used to indicate the spread angle between the cover and the main body element. This circuit may also be used with a slidable mobile telephone wherein the trimmer capacitor is connected to the cover by any suitable means such as a wheel connected to the trimmer capacitor and a cooperating track gear such that the track gear turns the wheel when the cover is moved which movement changes the capacitance of the trimmer capacitor.

Figure 11:
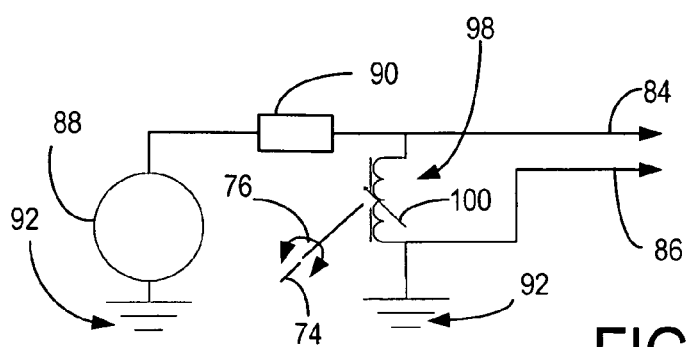
FIG. 11 shows an exemplary electrical circuit schematic diagram wherein a change in inductance of an inductor caused by movement of the cover changes the resonance frequency of a resonant circuit wherein the change in resonant frequency is indicative of the relative position between the cover and the main body element.

A further alternate embodiment of an electrical circuit to indicate the spread angle similar to the electrical circuits in FIGS. 9A, 9B and 10 is illustrated in FIG. 11 wherein a variable inductor generally designated 98 has for example the slug 100 of the variable inductor directly coupled to the hinge point 74 such that rotation of the cover with respect to the main body element in the direction indicated by the arrow 76 changes the position of the slug 100 and accordingly the inductance of the variable inductor 98. Preferably, the slug 100 is a ferromagnetic material which exhibits a relatively high relative permeability. A diamagnetic material may also be used for the slug, however the range of relative permeability is smaller than that of ferromagnetic material and is not as effective as a slug of ferromagnetic material. The change in inductance may be measured across the output terminals 84 and 86 by a suitable sensing circuit to indicate the spread angle between the cover and the main body element. The variable inductor 98 may also be part of a tuned resonant circuit wherein a change in the inductance caused by the rotation of the cover with respect to the main body element causes a change in the resonant frequency of the tuned circuit and which change in frequency may be used to indicate the spread angle between the cover and the main body element. The circuit may also be used in a slidable mobile telephone wherein the slug 100 is connected by any suitable means to move when the cover is slid with respect to the main body element to indicate the linear position of the cover with respect to the main body element.

Turning now to FIG. 12, a schematic representation of a portable electronic device embodying the present invention is illustrated therein and generally designated 102. The device 102 includes a first main body element or lower cover generally designated 104 and a first body element or upper cover generally designated 106 pivotally connected by a hinge 108 at the pivot point 110 on the lower cover 104 for rotational movement toward and away from the lower cover as indicated by direction arrow 112. Preferably the frame of the upper cover 106 is metallic and is grounded via the hinge 108 to the lower cover 104. A suitable conductor of a predefined length and width generally designated 114 is mounted and located in the lower cover as close as feasibly possible to the upper cover 106 and close to the hinge 108. The conductor can be for example, a predefined length of wire, metal coated tape or metal plate having a predetermined surface area to function as one plate of a capacitor. The upper cover functions as the other plate of the capacitor and together essentially forms a variable plate capacitor. Any two pieces of conductors can be used to make the two plates of a capacitor and as a practical matter a suitable surface area and suitable mechanics are required to carry out the detection function. The portable electronic device 102 in its closed position maximizes overlying coverage of the surface area of the conductor 114 in proximity to the metal frame cover 106. When the cover 106 is rotated about the pivot point 110 away from the lower cover 104, less and less of the metal frame cover 106 is in proximity to the indicator conductor 114 and accordingly the capacitance coupling between the upper cover and the indicator conductor 114 becomes less and less. In other words, as the cross-section between the plates varies, the capacitance varies. The change in the capacitance as the cover 108 is rotated relative to the lower cover 104 may be sensed and measured by a suitable circuit to provide an indication of the spread angle between the covers 104 and 106. The conductor 114 may also be an inductor 114 such that proximity of the metal frame 106 to the inductor as the cover 106 moves relative to the lower cover 104 changes the inductance and which change in inductance may be measured by a suitable circuit to provide an indication of the relative position, that is the spread angle or linear position between the upper and lower covers. The inductor may also be part of a resonant circuit wherein a change in the inductance due to the proximity of the metal frame upper cover 106 as it pivots about the pivot point 114 toward and away from the lower cover changes the resonant frequency and which frequency change can be used to indicate the spread angle or in the case of a slidable electronic device, extension and retraction of the upper and lower covers with respect to one another to indicate the linear position of the upper (or lower) cover relative to one another. It will be recognized that the indicator conductor 114 may also be located in the upper cover and form a variable plate capacitor with the lower cover to carry out the intended function.

It is also contemplated that two antennas such as planar antennas, arranged and suitably located within the mobile telephone covers could be used in a resonant circuit wherein movement of the covers with respect to one another would change the resonant frequency and which frequency change can be used to indicate the position of one cover with respect to the other. The frequencies on such an arrangement using antennas to form the variable plate capacitor would be in the RF frequency range.

Turning now to FIGS. 13A-13E, the spread angle between the main body element and the first body element or cover can be sensed and measured using a light polarization arrangement such as illustrated schematically in FIG. 13A. In the light polarization arrangement shown in FIG. 13A, a light emitting unit generally designated 120 is mounted and located for purposes of explanation in the first body element or upper cover of the portable electronic device however, the light emitting unit could also be located if desired in the main body element or lower cover. The light emitting unit includes a light emitting diode (LED) generally designated 122 to emit a light beam generally designated 124 having a time invariant visual spectrum signal with natural polarization as shown by the intensity/wavelength graphic representation in FIG. 13B and in a direction toward the end 123 of an optical multi-mode fiber generally designated 126 also located and arranged in the upper cover. Although an optical multi-mode fiber is used for purposes of explanation, any suitable type of optical fiber can be used. It is also contemplated that any suitable means for directing the light beam may be used, for example a mirror system. The optical multi-mode fiber 126 is mounted and arranged in the upper cover such that the fiber end portion 128 is centered on the hinge axis generally designated 130 of the hinge pivotally connecting the upper cover to the main body element. The light emitting unit 120 in the upper cover may also include an infrared (IR) LED generally designated 132 to emit a light beam which is also directed to the end 123 of the optical multi-mode fiber 126 and which IR light beam is in a non-visible spectral band as shown by the intensity/wavelength graphic representation in FIG. 13C. Approximately half of the light in the multi-mode fiber 126 is directed to the red path generally designated 136 and the remaining half of the light is directed to the blue path generally designated 138. The light in the red path 136 is aimed and passes through a red and IR pass filter 140 and the light in the blue path 138 passes through a blue and IR pass filter 142. An intensity/wavelength graphic spectral representation of the filter band pass signals received from the multi-mode fiber is shown in FIG. 13D wherein the blue light is designated 144, the red light designated 146 and IR light designated 148. The light passing through the red filter 140 is directed at a polarizer 150 which does not polarize the IR signal as represented by the light beam 152 but polarizes the red signal as represented by the light beam 154. The light in the blue path passes through the polarizer 156 which is phased differently than the phase of the red polarizer 150 wherein the blue light is polarized as indicated by the light beam 158 and the IR light is not polarized as indicated by the light beam 160. The red and blue polarized light along with the unpolarized IR light is aimed at and passes through a secondary polarizer generally designated 162. The secondary polarizer 162 is arranged to rotate about the hinge axis 130 as the cover rotates or pivots with respect to the main body element. The polarization angle generally designated 164 increases or decreases as the emitting portion and receiving portion of the light polarization arrangement rotate relative to one another. The light passing through the secondary polarizer 162 is reflected and directed to the receiving end 166 of the optical fiber 168 which is suitably located and arranged in the main body element in this example. The receiving end could likewise be located and arranged in the upper cover when the light emitting unit is located in the lower cover. The received light is directed through a red filter 170, a blue filter 172 and an IR filter 174 respectively. The red filter 170 passes only the light that has gone through the red filter 140 and the polarizer 150. The blue filter 172 passes only the light that has gone through the blue filter 142 and the polarizer 156. The IR filter 174 passes only IR light. The IR filter 174 is not required if the IR receiver has no sensitivity in the visible band. The intensity of the red light 176, blue light 178 and IR light 180 as a function of the angle 164 of the secondary polarizer 162 is illustrated in FIG. 11E wherein the resultant response 182 represents the red light intensity, resultant response 184 represents the blue light intensity and resultant response 186 designates the IR light intensity. The magnitude of the respective light intensities can be measured to indicate the spread angle between the cover and the main body element.

The light polarization arrangement as illustrated in FIG. 13A may be mechanically carried out utilizing the structure illustrated in FIG. 14 which is a schematic representation of a concentric drum wherein an outer drum generally designated 200 is mechanically connected and arranged to rotate about the pivot axis of the hinge between the cover and the main body element. The outer drum 200 rotates with the cover or main body element and a smaller concentric drum generally designated 202 is arranged within the outer drum 200 and is arranged to rotate with the other of the cover or main body element such that the drum 202 rotates relative to the drum 200 as the cover moves toward and away from the main body element. The beams from the light emitting unit are carried by the optical fiber 204 to the light filter and polarizer unit 206 and which filter and polarizer arrangement is located on the hinge axis. The light beams passing through the filter and polarizer unit illustrated by the light beam 208 are directed toward the receiving secondary polarizer generally designated 210 suitably connected to the outer drum 200 for rotation therewith as the cover pivots with respect to the main body element. The received light beam through the secondary polarizer 210 is aimed at and carried by the fiber 212 to the respective light filters as discussed above. Again, either the filter and polarizer unit 206 may be fixed to rotate with the drum 202 or the secondary polarizer 210 may be fixed to rotate with the outer drum 200 such that the relative movement between the cover and main body element may be detected in accordance with the light polarization arrangement as discussed above in connection with FIGS. 13A-13E.

An alternate embodiment is illustrated in FIG. 15 wherein the pass filter and polarizer unit 206 and the secondary polarizer 210 may be mounted in a suitable material such as silicone generally designated 220 such that the respective ends 222, 224 twist or rotate with respect to one another as the cover pivots with respect to the main body element. The components forming the pass filters and polarizers are suitably molded into the silicone or other suitable material and provide a hermetic seal which seal is waterproof and dust proof. The silicone or other suitable material 220 must be able to twist over the full spread angle from a closed position to a fully open position of the portable electronic device without breaking or fracturing. A material having a suitable optically active property might be used in place of the silicone rotation assembly to allow use of a single polarizer rather than the multiple polarizers as shown in the light polarization arrangement of FIG. 13A.

Figure 16:
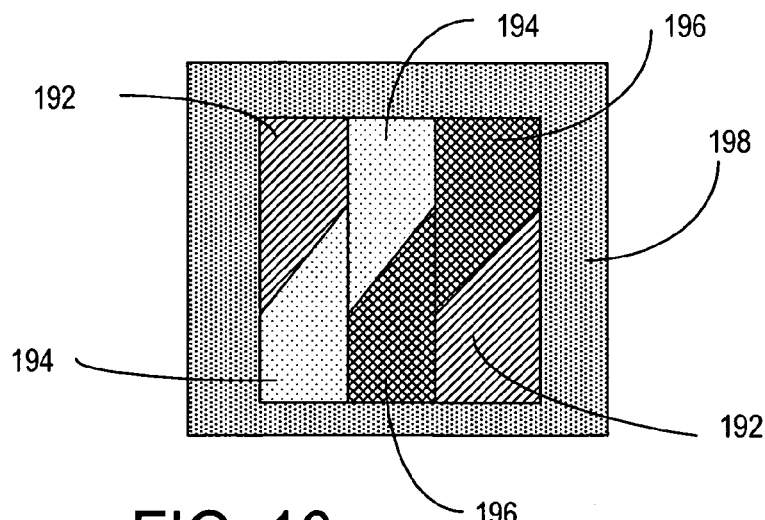
FIG. 16 is a schematic representation of an all pass color filter that may be utilized in an alternate embodiment of the present invention.

Although the foregoing embodiment is described with two beams of light it will be recognized that only at least one beam of light is necessary to obtain an indication of the relative position of the covers with respect to one another. Likewise although different colored light beams are described for purposes of explanation, the light beams can vary significantly both in width and wavelength and in fact may be very narrow. Laser beams may be used to carry out the intended functions. Obviously the filters are modified to have the required characteristics to discriminate between the laser light beams and to detect changes as a result of one cover moving relative to the other. It is also contemplated that in addition to the light polarization arrangement described above, it would be possible to use a suitably faded color all pass-filter such as illustrated schematically in FIG. 16 made in the shape of a circle so that the angle can be measured. The all pass-filter as illustrated includes graduated bands of colors red 192, green 194 and blue 196 surrounded by gray 198.

In summary, it can be seen that the relative movement between the light emitting side and the light receiving side of the light polarization arrangement in FIG. 13A provides a novel arrangement for detecting and measuring the spread angle or in the case of a slidable electronic device the linear position between the cover and the main body element. In addition, the light polarization arrangement allows data to be carried and sent by the IR light beam from the upper cover to the main body element and which data may provide an additional function for the portable electronic device.

Figure 17:
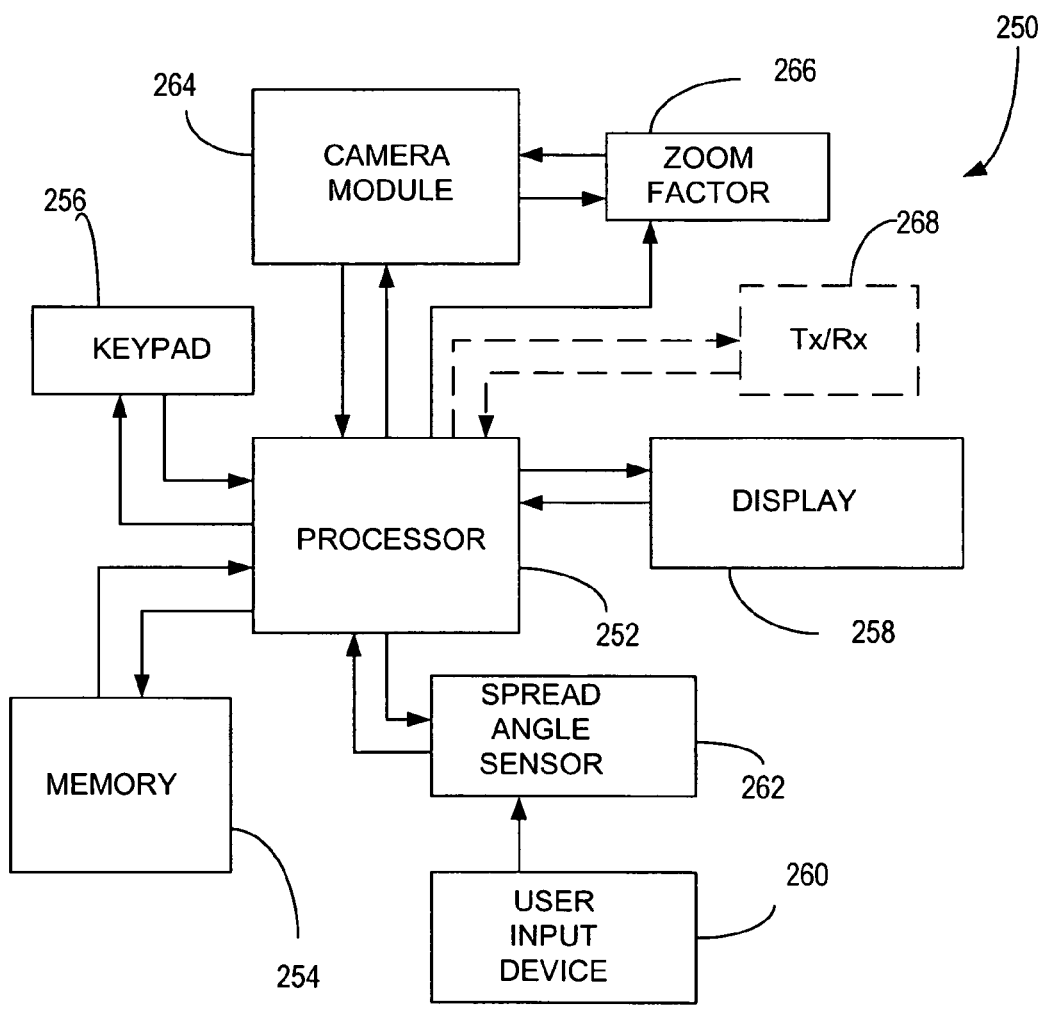
FIG. 17 is a schematic function block diagram showing the major operational components of a portable electronic device embodying the present invention.

Turning now to FIG. 17, a schematic functional block diagram of a portable electronic device generally designated 250 is illustrated therein showing the major operational components of an exemplary embodiment of the present invention to carry out the intended functions of the device. A processor generally designated 252 carries out the computational and operational control of the device in accordance with one or more sets of instructions stored in a memory 254. A keypad 256 may be used to provide alphanumeric input and control signals by a user and is arranged in accordance with the intended function to be carried out. A display 258 sends and receives signals from the processor 252 which processor controls the graphic and text representations shown on a screen of the display in accordance with the function being carried out. A user input device generally designated 260 is electrically coupled to a spread angle sensor generally designated 262 which detects and senses the spread angle between the user input device 260 and the main body element of the portable electronic device 250. The spread angle sensor 262 is electrically connected to the processor 252 which processor receives the appropriate representative signals from the spread angle sensor 262 to process and generate the necessary signals to provide an indication of the spread angle. A camera module designated 264 is connected to the processor 252 and receives appropriate control and data signals to carry out the camera functionality of the portable electronic device in a well-known manner. In accordance with the present invention, a zoom factor is selected in accordance with the zoom factor function block 262 which zoom factor function is coupled between the camera module 264 and the processor 252. The zoom factor 266 is selected in accordance with the spread angle sensor output signal sent to the processor 252. In the instance that the portable electronic device is a mobile telephone for example, the processor 252 controls a transmit/receive unit shown in the dash-line function block 268 and which transmit/receive unit operates in a manner well known to those skilled in the art.

The invention claimed:

1. A portable electronic device comprising:
a user input device comprising:
a first body element;
a main body element;
said first body element and said main body element further arranged and configured for cooperative engagement and relative movement about a hinge axis along a path with respect to one another between a closed overlapping operative position and an open spread apart operative position;
a sensor comprising a light polarization system arranged to be connected between said main body element and said first body element, said sensor further configured to be responsive to the relative movement of one of said first body element and said main body element with respect to the other of said first body element and said main body element arranged and configured to detect a relative position of said first body element with respect to said main body element to produce an output signal having a magnitude proportional to the detected relative position of said first body element with respect to said main body element to control the operation of an intended function of said portable electronic device;

said light polarization system comprising a light emitting unit to emit a first light beam having a visual spectral band signal with natural polarization and a second light beam having a non-visible spectral band signal, a multi-mode optical fiber to receive and direct said first light beam along a first optical path to a first light polarizer through a non-visible optical band filter and first optical wavelength filter to produce a first non-polarized non-visible spectral optical band signal and a polarized first optical wavelength optical band signal and to receive and direct said second light beam along a second optical path to a second light polarizer having a phase different from said first light polarizer through a non-visible optical band filter and second optical wavelength filter to produce a second non-polarized non-visible spectral optical band signal and a polarized second optical wavelength optical band signal, said first and second non-polarized non-visible spectral optical band signals, said polarized first optical wavelength optical band signal and said polarized second optical wavelength optical band signal all arranged to pass through a third polarizer configured to rotate about said hinge axis as said first body element and said main body element rotate about said hinge axis with respect to one another to a receiving end of an optical fiber to direct the received first and second non-polarized non-visible spectral optical band signals, said polarized first optical wavelength optical band signal and said polarized second optical wavelength optical band signal through a first optical wavelength optical band filter, a second optical wavelength optical band filter and a non-visible spectral optical band signal filter such that the magnitude of the intensity of the resultant first optical wavelength light and second optical wavelength light vary in accordance with the relative position of said first body element with respect to said main body element.

2. The portable electronic device as defined in claim 1 wherein said relative movement of said first body element and said main body element is arranged and configured for continuous motion between said closed operative position and said open operative position.

3. The portable electronic device as defined in claim 2 further comprising a camera module for capturing images wherein said camera module includes a camera zoom functionality wherein the zoom factor is selectable in accordance with a said relative position of said first body element with respect to said main body element through a range of relative movement between said closed operative position and said open operative position.

4. The portable electronic device as defined in claim 3 comprising a camera module for capturing images wherein said camera module is arranged and configured with a camera zoom functionality responsive to the relative position of said first body element with respect to said main body element wherein the zoom factor is selectable through at least a portion of said range of relative movement between said closed operative position and said open operative position.

5. The portable electronic device as defined in claim 2 further comprising said main body element arranged and configured with a first surface relative to usage and a screen located in at least a portion of said first surface for displaying alphanumeric characters and graphics and images.

6. The portable electronic device as defined in claim 5 wherein said first body element is arranged and configured with a first outwardly facing surface relative to usage and a second surface opposite said first outwardly facing surface, wherein said second surface is in facing relationship with said main body element first surface in a closed operative position such that said main body element first surface is concealed and not accessible, and wherein in an open operative position said first body element is arranged and configured for positioning away from said main body element first surface such that said main body element first surface is accessible.

7. The portable electronic device as defined in claim 6 wherein at least another portion of said main body element first surface is arranged and configured with an arrangement of keys in a given configuration to carry out an intended function.

8. The portable electronic device as defined in claim 6 further comprising said first body element arranged and configured so that said screen is viewable when said portable electronic device is in its said closed operative position and in its said open operative position and at least partially viewable through at least a portion of said range of relative movement between said closed operative position and said open operative position.

9. The portable electronic device as defined in claim 4 wherein said camera zoom factor is arranged to increase in response to said relative position of said first body element changing along said range of relative movement when said first body element is arranged and configured for movement in a direction from said closed operative position toward said open operative position.

10. The portable electronic device as defined in claim 4 wherein said camera zoom factor is arranged to decrease in response to said relative position of said first body element said first body element is arranged and configured for movement in a direction from said open operative position toward said closed operative position.

11. The portable electronic device as defined in claim 4 wherein said camera zoom factor is arranged to increase in response to said relative position of said first body said first body element is arranged and configured for movement in a direction from said open operative position toward said closed operative position.

12. The portable electronic device as defined in claim 4 wherein said camera zoom factor is arranged to decrease in response to said relative position of said first body element said first body element is arranged and configured for movement in a direction from said closed operative position toward said open operative position.

13. The portable electronic device as defined in claim 3 wherein said camera module is arranged and configured with a shutter release.

14. The portable electronic device as defined in claim 13 wherein said shutter release is configured to be responsive to a touching contact on a key located on said main body element.

15. The portable electronic device as defined in claim 13 wherein said shutter release is configured to be responsive to a touching contact on a key located on said first body element.

16. The portable electronic device as defined in claim 1 further comprising a mobile telephone.

* * * * *